Dec. 8, 1925.  
W. A. WOOD  
1,564,993  
DASH RECEPTACLE FOR AUTOMOBILES  
Filed Oct. 18, 1923
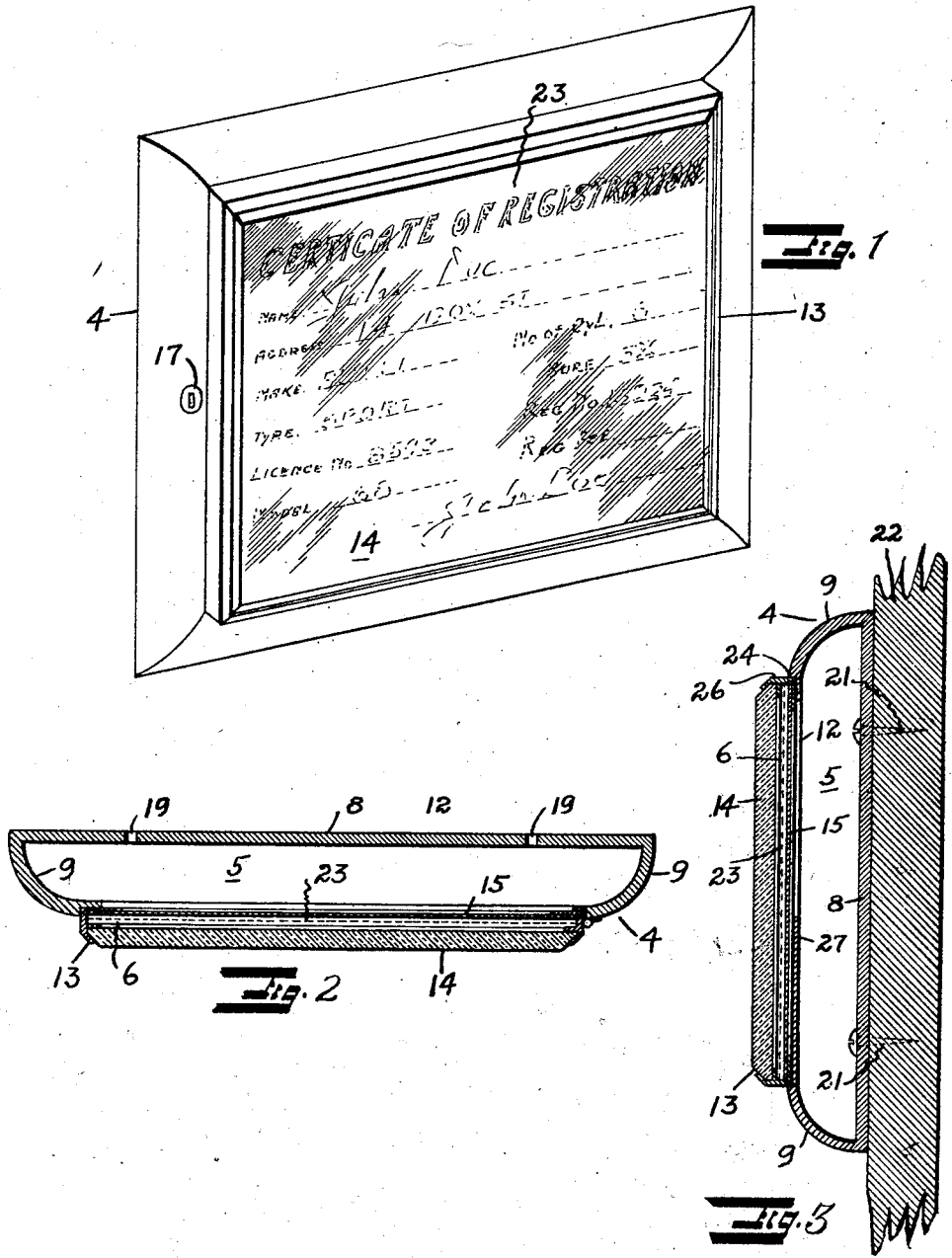
INVENTOR.  
WILLIAM A. WOOD  
BY Joseph B. Gardiner  
his ATTORNEY.

Patented Dec. 8, 1925.

1,564,993

UNITED STATES PATENT OFFICE.

WILLIAM A. WOOD, OF OAKLAND, CALIFORNIA.

DASH RECEPTACLE FOR AUTOMOBILES.

Application filed October 18, 1923. Serial No. 669,292.

*To all whom it may concern:*

Be it known that I, WILLIAM A. WOOD, a citizen of the United States, and a resident of Oakland, county of Alameda, and State of California, have invented a certain new and useful Dash Receptacle for Automobiles, of which the following is a specification.

My invention relates to a receptacle or holder arranged to contain and display the registration certificate of an automobile and is adapted to be attached to the dash thereof.

An object of the invention is to provide a holder of the character described which will not only serve as an effective means for displaying the certificate, but will afford a means of storing small articles and preventing the surreptitious removal of the certificate and said articles.

Another object of the invention is to provide a device of the character described which is extremely simple and inexpensive in construction and yet is very neat and attractive in appearance.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a perspective view of the device of my invention.

Figure 2 is a horizontal section of the device.

Figure 3 is a vertical section of the device attached to the dash board of the automobile.

The registration certificate of an automobile is usually held and displayed in a case positioned on the dash of the automobile. With the case as heretofore constructed and as secured in position, unauthorized removal thereof together with the certificate is a simple matter owing to the fact that the securing means is exposed. However, in accordance with my invention such removal is effectively prevented. In addition to this feature and to some extent incorporated therewith are means for storing against surreptitious removal, small articles, such as an operator's license, extra switch keys, etc. which the motorist desires to carry on the automobile but which he usually finds difficult to conceal in some easily accessible location on the automobile.

A detailed description follows:—

As illustrated in the drawings the device comprises a receptacle 4 in which are formed two compartments 5 and 6. The compartment 5 includes a rear wall 8 and edge walls 9 the forward extremities of which define the sides of an opening 12. The latter is spaced from the rear wall 8 so as to provide a storage space therebetween. Hinged to an edge of the opening is a closure member 13 between the forward and rear plates 14 and 15 of which is formed the before-mentioned compartment 6. The member 13 is adapted to completely cover the opening and may be locked in closed position by means of a suitable key lock 17. It will thus be noted that with the member 13 in closed position and locked, unauthorized access to the compartment 5 will be prevented. Means are therefore provided, which are only accessible from compartment 5, for securing the device to the dash of the automobile. Formed in the rear wall 8 and positioned within the edges thereof are apertures 19 in which are arranged to engage screws 21 which are adapted to be screwed in the dash board 22. The heads of the screws are adapted to lie within the compartment, therefore, when the member 13 is locked in closed position, tampering with the screws will be impossible and removal of the case will be prevented.

The front plate 14 of the compartment 6 is formed of glass or other transparent material so that the registration certificate 23 which is adapted to be arranged in this compartment, will be visible. In order that the certificate may be readily inserted in or removed from the compartment, I preferably mount the rear plate 15 so that it can be removed through a slot 24 formed in the edge wall 26 of the compartment 6. When the member 13 is fully closed the slot lies, as shown in Figure 3, within the outer extremity of one of the edge walls 9 of the compartment 5. The compartment 5 is preferably made large enough to accommodate cards, keys and the like, and in order that said articles when arranged therein will not fall out when the member 13 is opened, I extend the forward extremity of the bottom edge wall 9 upwardly as at 27.

The edge wall 9 is preferably curved forwardly and downwardly, thereby giving the case an attractive and substantial appearance. Furthermore, the edges of the glass plate may be beveled, thus also adding to the attractiveness of the device.

I claim:

1. A dash receptacle for automobiles comprising a casing having an opening at the front thereof, a receptacle hinged to said casing arranged to close said opening and comprising a portion arranged to lie within said opening and a portion arranged to extend outwardly therefrom when the receptacle closes the opening, said receptacle provided with a slot in its edge wall which is adapted to lie within and be closed by a wall of said casing when the receptacle occupies said opening and a transparent outer wall for said receptacle.

2. A dash receptacle for automobiles, comprising a casing having a back plate, side walls projecting inwardly and forwardly from and completely around the edges of said back plate and defining an opening to said casing along their inner edges, the side wall at the bottom edge of said plate being extended further inwardly than the remaining side walls, and each of said side walls being depressed along their inner edges to define a seat, and a card receptacle hinged to said casing and arranged to engage in said seat so as to close said opening, the front wall of said receptacle being transparent.

In testimony whereof, I have hereunto set my hand at Oakland, this 5th day of October, 1923.

WILLIAM A. WOOD.